United States Patent [19]

Ivey

[11] Patent Number: 5,593,292
[45] Date of Patent: Jan. 14, 1997

[54] VALVE CAGE FOR A ROD DRAWN POSITIVE DISPLACEMENT PUMP

[76] Inventor: Ray K. Ivey, 315 - 19 Street, Calgary, Alberta, Canada, T2F 6J7

[21] Appl. No.: 237,808

[22] Filed: May 4, 1994

[51] Int. Cl.⁶ .......................... F04B 47/00; F04B 53/12
[52] U.S. Cl. .................. 417/554; 417/569; 137/533.15
[58] Field of Search .................. 417/554, 555.2, 417/569; 137/533.11, 533.13, 533.15

[56] References Cited

U.S. PATENT DOCUMENTS

| | | | |
|---|---|---|---|
| 1,214,400 | 1/1917 | Wigle | 137/533.15 |
| 1,284,641 | 11/1918 | Francis | 417/554 |
| 1,555,068 | 9/1925 | Nixon | 137/533.15 |
| 1,706,593 | 3/1929 | Sargent | 137/533.13 |
| 2,003,679 | 6/1935 | Crickmer et al. | 137/533.15 |
| 2,005,299 | 6/1935 | Penrod | 137/533.15 |
| 3,491,790 | 1/1970 | Sanford. | |
| 3,535,056 | 10/1970 | Harbison. | |
| 3,724,496 | 4/1973 | Secrist. | |
| 5,061,159 | 10/1991 | Pryor. | |

FOREIGN PATENT DOCUMENTS

| | | | |
|---|---|---|---|
| 125438 | 5/1910 | Canada. | |
| 2021595 | 7/1990 | Canada. | |
| 273170 | 6/1927 | United Kingdom | 417/554 |

*Primary Examiner*—Richard A. Bertsch
*Assistant Examiner*—Roland G. McAndrews, Jr.
*Attorney, Agent, or Firm*—Millen, White, Zelano, & Branigan, P.C.

[57] ABSTRACT

A valve cage whose tubular side wall has a progressively diminishing thickness between the seat and the stop means, whereby the bore is tapered and upwardly enlarging in that interval. Therefore the flow area between the ball provided in the bore and the side wall increases as the ball ascends. The side wall has ball guide ribs which project inwardly and increase in height at the same rate as the wall thickness diminishes, so that the ribs form a race of constant diameter, for guiding the ball as it moves vertically and preventing it from moving laterally. The ball stop is positioned at the top of the cage and the external thread for connection with the pump barrel is positioned intermediate the ends of the cage. This arrangement enables the seats of the travelling and standing valves to come close together at the bottom of the down stroke of the plunger. At their upper ends, the ball guide ribs join to form a ball stop that has a hemispherical configuration, to better distribute contact between the valve ball and the stop.

3 Claims, 4 Drawing Sheets

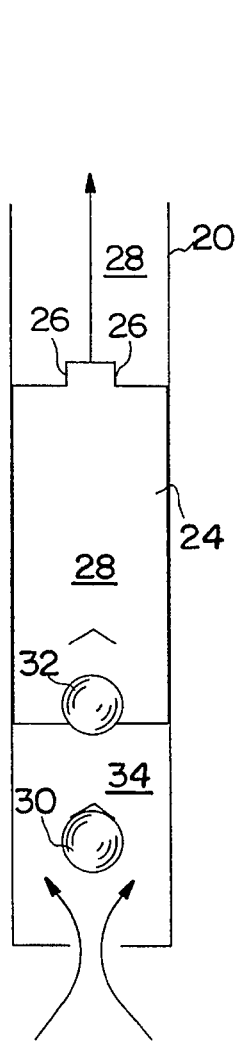
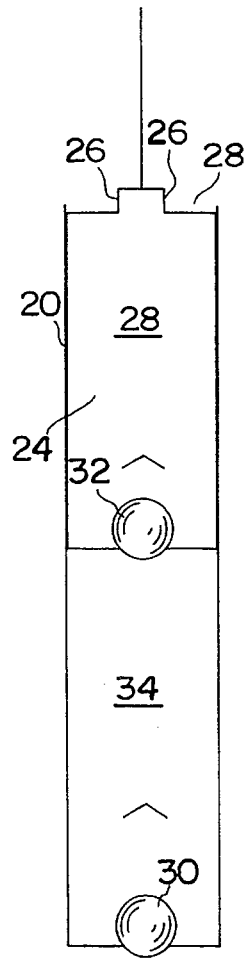
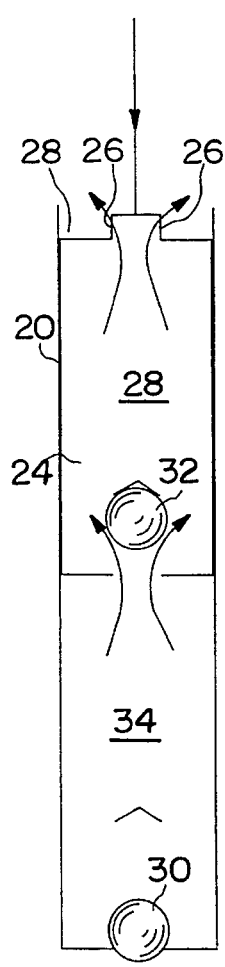
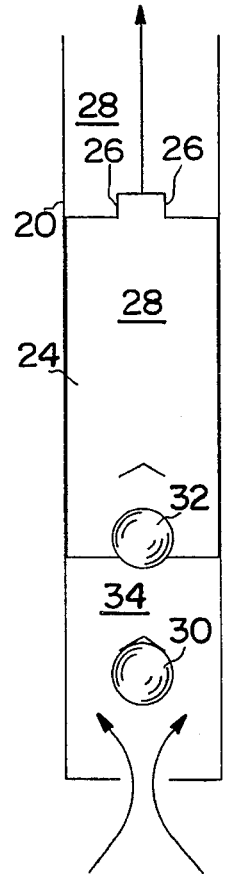
FIG.1a
PRIOR ART
FIG.1b
PRIOR ART
FIG.1c
PRIOR ART
FIG.1d
PRIOR ART

VALVE CAGE FOR A ROD DRAWN POSITIVE DISPLACEMENT PUMP

FIELD OF THE INVENTION

This invention relates to a valve cage for use in a reciprocating rod drawn positive displacement pump.

BACKGROUND OF THE INVENTION

A rod drawn positive displacement pump (otherwise known as a downhole sucker rod pump) in use is located at the bottom of a string of tubing in a wellbore. The plunger of the prior art pump is reciprocated by a string of sucker rods extending down through the tubing. A pump jack at ground surfaces reciprocates the sucker rod string.

The basic parts of the prior art are shown schematically in prior art FIG. 1. They comprise: a cylindrical tubular outer barrel 20 communicating at its upper end with the tubing bore; a cylindrical tubular plunger 24 working within the barrel 20 and communicating at its upper end through ports 26 with the bore 28 of the barrel; and standing and travelling valves. The standing valve 30 is positioned usually in the bottom end of the barrel 20 and controls the entry of fluid into its bore 28. The travelling valve 32 is positioned usually in the bottom end of the hollow plunger 24 and controls entry of fluid into its bore 28 on the up stroke of the plunger 24 (FIG. 1a), fluid moves from the reservoir through the open standing valve 30 and into a "compression chamber 34", which is that portion of the barrel 20 bore between the two valves 30 and 32. As the plunger 24 reverses its travel and begins to move downwardly on the down stroke (FIG. 1 b), the standing valve 30 closes and the fluid in the compression chamber 34 is compressed. When the pressure in the compression chamber 34 is greater than the pressure exerted on the ball 32 of the travelling valve by the column of fluid standing above it in the tubing bore 28, the travelling valve 32 opens. The fluid in the compression chamber then moves through the travelling valve as the piston 24 falls through it (FIG. 1c). When the piston 24 reverses and starts back up (FIG. 1 d), the travelling valve closes 32 and the fluid above it is lifted toward ground surface. Also, a new cycle of pumping is initiated because the standing valve again opens to admit fluid from the reservoir into the compression chamber 34.

Although only a relatively small amount of fluid is pumped with each stroke, the production of a well can be large as it is worked 24 hours a day at a constant rate. It is common for a pump to be stroked 10,000 times a day.

The pump valves 32 and 34 experience widely varying conditions depending on factors such as stroke length and speed, oil viscosity, gas to oil ratio and particulate matter content in the produced fluid. The conditions arising from these factors and affecting the valve performance include fluid velocity, pressure drop, gas locking, fillage time, sand erosion, stroke loss and the like. One of the objectives of the present invention is to modify the valve cage to provide a valve that is better adapted to cope with these factors and conditions to yield a better performing valve and pump.

At this point is useful to shortly describe the parts of a conventional standing or travelling valve. These valves basically are one form of a ball check valve. More particularly, having reference to prior art FIG. 2a and 2b, the valve comprises a cage. The cage is generally tubular in configuration and defines an axial bore 35 extending therethrough. Adjacent its lower end, the cage wall forms an inwardly protruding, internal, annular seat shoulder 36. A valve ball 38 and seat 40 are inserted through the bottom of the bore 35. The seat 40 abuts the seat shoulder 58. A lock ring or seat retainer 42 is threaded into the bottom of the bore 35, to lock the seat ring 40 in place. The valve ball 38 is thus positioned above the secured seat 40 and can seal against an annular lapped sealing surface on the upper side of the seat orifice. A stop 44 extends transversely across the cage bore 35 at a point spaced above the seat 40. Commonly the stop 44 is a horizontal bar extending between opposed points on the cage side wall 46. The stop 44 is integral with the side wall 46. It functions to limit upward travel of the ball 32. A plurality of internal, elongated, circumferentially spaced apart, inwardly protruding guide ribs 48 extend between the seat shoulder 36 and the stop 44. These guide ribs 48 form a race of constant diameter, for closely guiding the ball 38 so that it moves only vertically. The side wall 46 thickens inwardly where the stop 44 is formed and this reduced bore diameter section 50 continues on up to the top end of the cage, with few exceptions. An external thread 52 is formed in the top end of the outer surface of section, for connection with the barrel or plunger.

The conventional valve shown in FIG. 2 has been in existence and widely used for a number of decades.

As a result of working with these valves for many years, the present applicant has identified a number of characteristics that would be desirable to incorporate into them. More particularly, it would be desirable:

(a) To bring the standing and travelling valve seats closer together at the bottom of the down stroke, to improve compression ratio and reduce gas locking;

(b) To provide increased flow area in the valve, to reduce pressure drop and thereby improve fillage;

(c) To automatically vary the flow capacity of the valve in response to variation in the flow rate of the fluid seeking to move through the valve, to diminish pressure drop and reduce stroke loss;

(d) To reduce spalling of the ball, which can occur when the ball contacts the conventional stop bar; and (e) To induce the fluid to spin as it passes through the cage, to thereby increase the "hang time" of entrained solid particles in the liquid and keep them suspended, rather than having them settle onto the valve parts.

The present invention is directed toward modifying the valve cage so that the valve and pump incorporating it can acquire some or all of these characteristics and their benefits.

SUMMARY OF THE INVENTION

In accordance with the essential feature of the invention, the thickness of the side wall of the cage is progressively diminished between the seat shoulder and the stop means, to provide a bore section that is tapered and upwardly enlarging. Thus, as the ball rises from its seat the flow area around it progressively and automatically increases. Since the rise of the ball is dependent on the rate of fluid flow, tapering the side wall between seat shoulder and stop means has the following results:

The flow area around the valve ball automatically increases as the volume of fluid seeking to move through the valve increases. This helps to reduce increases in pressure drop across the valve; and The ball is kept closer to the seat than would be the case if the flow area did not increase. By keeping the ball close to the seat, stroke loss can be reduced (stroke loss refers to fluid lost back to the reservoir during the momentary interval when the ball is dropping and sealing at the beginning of the down stroke).

In a preferred feature of the invention, the ball guide ribs have an increasing height between the seat shoulder and the stop means. The height of the ribs increases in relation to the reduction in side wall thickness, so that a ball race of appropriate constant diameter is created by the ribs. Thus the ball is free to rise vertically but is kept from moving laterally to any significant extent.

In another preferred feature, the cage is formed by casting. This enables forming the ball guide ribs with squared corners, which significantly increases the flow area relative to that of a cage manufactured by machining (which is the normal prior art practice).

In another preferred feature, the stop means in the standing valve cage is located in the uppermost wall segment of the cage and the external threads are now located intermediate the ends of the cage, at an elevation preferably and approximately corresponding with the elevation of the seat shoulder. These changes have the following results:

The valve seats of the travelling and standing valves are now typically spaced apart about 4 inches at the bottom of the down stroke. (By way of comparison, the prior art units have a seat separation in the order of 5–8 inches at the bottom of the down stroke.) By incorporating this modification into a pump, the compression ratio is much increased and the likelihood of failing to create sufficient pressure to unseat the travelling valve ball is reduced;

Since the stop means have been moved to the top of the cage, it has been necessary to move the external threads downwardly, to a segment of the side wall where the cage side wall is relatively thick.

In another preferred feature, the upper ends of the guide ribs protrude inwardly further and join to create stop means having the configuration of a hemispherical socket. This socket is adapted to closely fit the valve ball. Thus when the ball contacts the curved rib ends forming the socket, the impact is now distributed over the surface of the ball and the likelihood to cause spalling is reduced.

In another preferred feature, the guide ribs have a helically twisting configuration so that they function as vanes to impart rotation or swirl to the fluid moving past them. This aids in helping to keep entrained solid particles suspended longer to inhibit accumulation and is helpful in reducing erosion of the valve parts.

DESCRIPTION OF THE DRAWINGS

Prior art FIGS. 1a, 1b, 1c and 1d are schematic side views of a conventional plunger working in a barrel, illustrating the various modes of the valves and the directions of fluid flow during one stroke cycle;

Prior art

Prior art

DESCRIPTION OF THE PREFERRED EMBODIMENT

Figure 2:
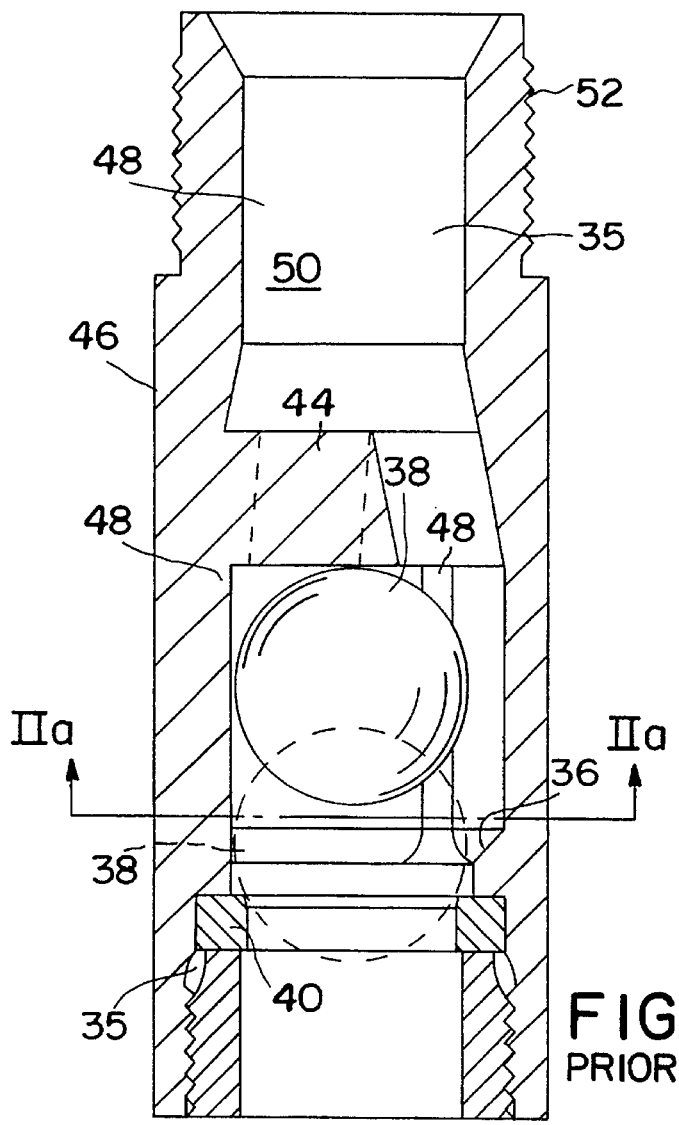
FIG. 2 is a sectional side view of a conventional cage.
Figure 2A:
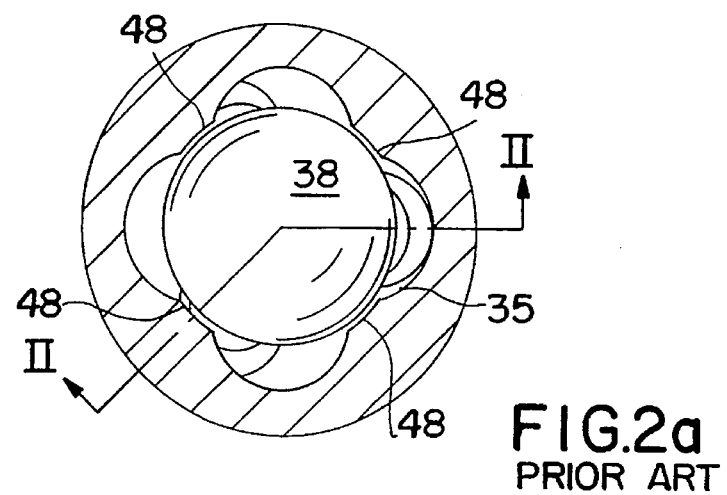
FIG. 2a is a sectional view taken along the line 2a —2a of FIG. 2.
Figure 3:
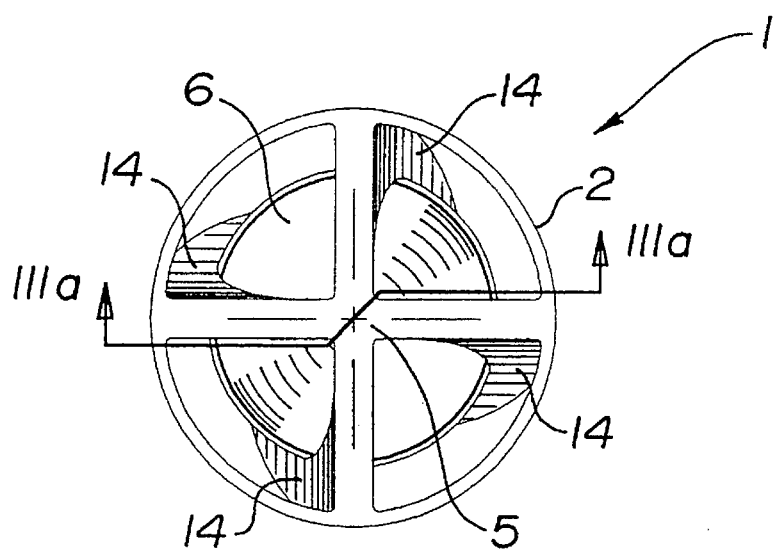
FIG. 3 is a top end view of a valve having a cage in accordance with the invention.
Figure 3A:
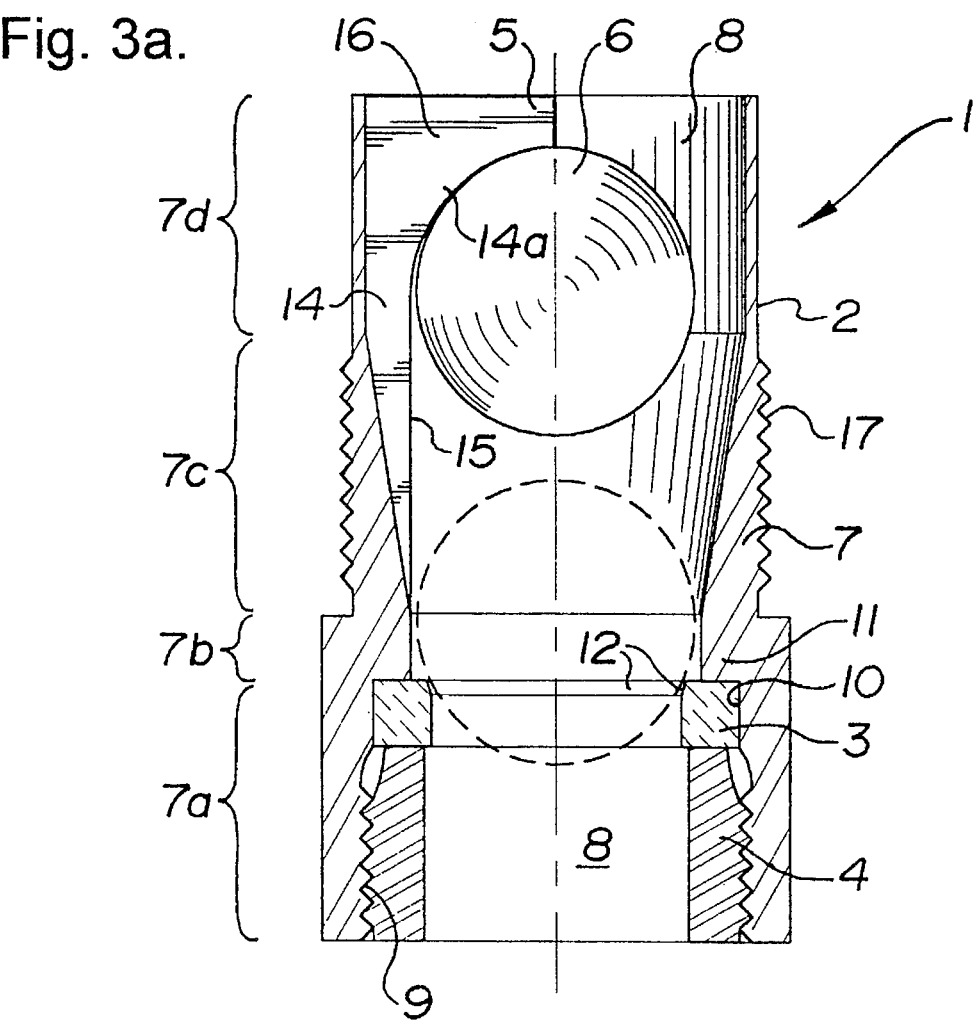
FIG. 3a is a sectional side view of the valve, comprising cage, seat and valve ball, taken along line 3a —3a of FIG. 3.
Figure 4:
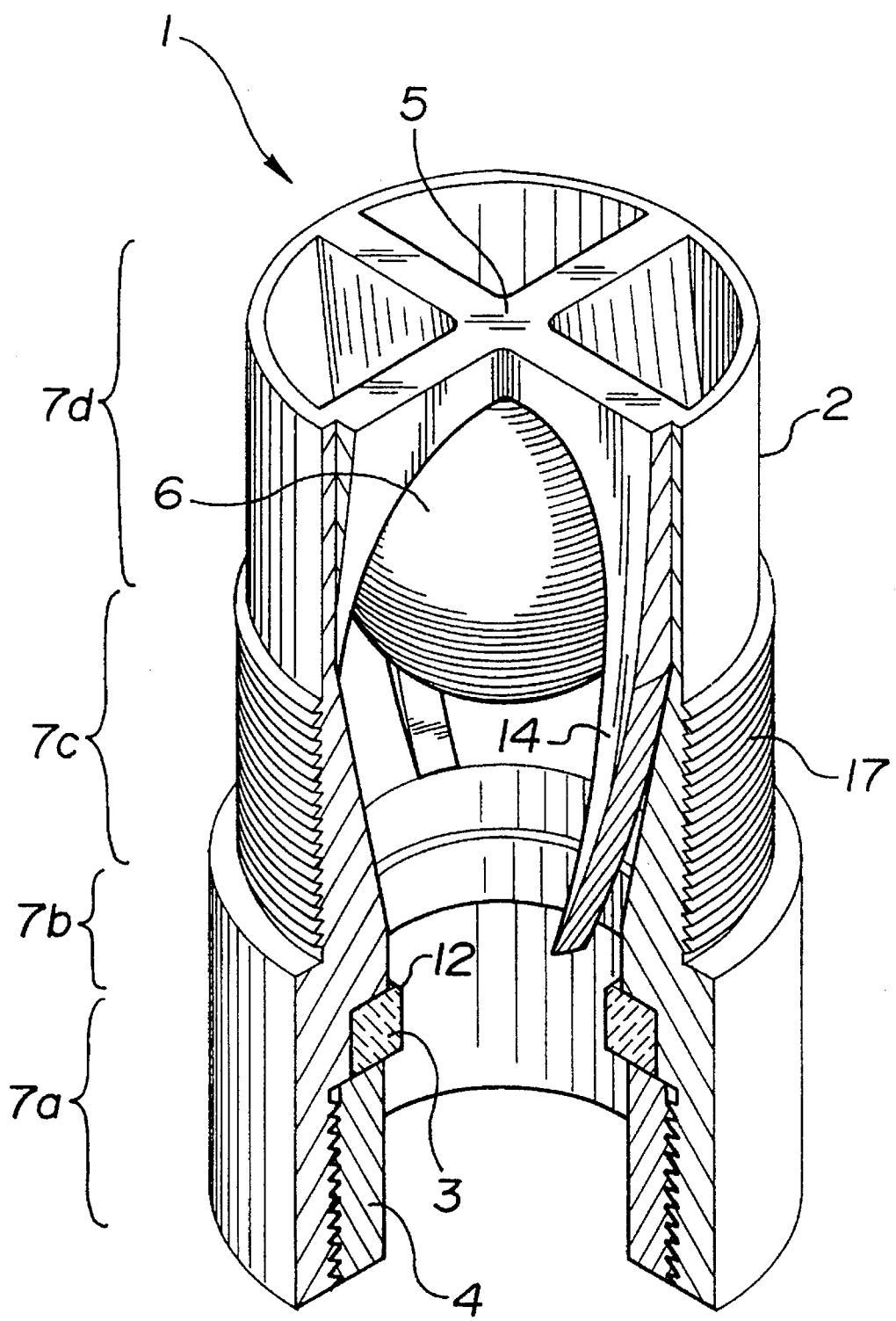
FIG. 4 is a perspective, partly broken away view of the cage of FIG. 3a, showing its internals —the rib 14 would normally be integral with the broken away section of cage side wall.

Having reference to FIGS. 3 to 4 inclusive, a valve 1 is shown that can function as either a standing valve or travelling valve. The valve 1 comprises a cage 2, a seat 3, a lock ring or seat retainer 4, a ball stop 5 and a valve ball 6.

The cage 2 has a side wall 7 which, from the bottom, comprises a bottom wall segment 7a, a shoulder wall segment 7b, a tapered wall segment 7c and a stop wall segment 7d.

The side wall 7 is tubular in configuration and forms an axial bore 8 of cylindrical cross-section.

The bottom wall segment 7a forms an internal thread 9, for engaging the seat retainer 4.

The shoulder wall segment 7b comprises a short land 10 which extends upwardly from the internal thread 9. The shoulder wall segment 7b further forms an inwardly protruding, annular seat shoulder 11. The seat 3 is inserted into the bore 8 from the bottom. It is supported by the land 10 and abuts the seat shoulder 11. The seat retainer 4 is screwed into the internal thread 9 to secure the seat 3 against the seat shoulder 11.

The seat 3 provides an annular seating area 12 on its upper surface.

The tapered wall segment 7c diminishes progressively in wall thickness between the seat shoulder 11 and the stop 5. Thus the portion of the cage bore 8, which is formed by wall segment 7c, is tapered and upwardly enlarging.

The tapered wall segment 7c further forms a plurality of internal elongated, circumferentially spaced apart, square cornered, inwardly projecting ball guide ribs 14 which extend upwardly and longitudinally from about the seat shoulder 11 to about the stop 5. The ribs 14 progressively increase in height, to the same extent that the wall thickness of the tapered wall segment 7c diminishes, so that a race 15 of constant diameter is provided. The race 15 allows the valve ball 6 to rise from the seat 12, guides it as it moves vertically and prevents it from moving laterally to any significant extent.

It will be noted that the "port" or flow area between the valve ball 6 and the tapered wall segment 7c increases as the ball rises.

The stop wall segment 7d forms a land 16 across which the guide ribs 14 extend in an upward direction. However, in this segment the upper ends 14a of the ribs 14 project further inwardly and join to form the stop 5. The rib ends 14a have curved rims so that the stop 5 has the configuration of a hemi-spherical socket adapted to conform to the valve ball 6.

The guide ribs upper ends 14a have a helically twisting configuration. These twisted ribs induce fluid moving past them to adopt a swirling or rotational motion as it leaves the valve 1. This motion assists in keeping entrained particulate solids in a suspended state for a longer time, so there is less likelihood of them settling onto the internals of the valve. The tapered wall segment 7c forms an external thread 17, located intermediate or between the ends of the cage. The external thread 17 is adapted to engage the barrel or plunger of the pump.

The valve 1 is characterized by the following attributes:

the flow area around the valve ball increases with the rise of the ball;

the distance between the travelling and standing valve seats is reduced relative to the conventional design, because the stop is now at the top of the standing valve; and the contact area between the stop means and the ball is greater than that of the conventional design.

The embodiments of the invention in which an exclusive property or privilege is claimed are defined as follows:

PROPERTY OR PRIVILEGE IS CLAIMED ARE DEFINED AS FOLLOWS:

1. A cage for a reciprocating rod drawn positive displacement pump valve, comprising:

a generally tubular side wall forming an axial bore for containing a valve ball, said side wall having upper and lower ends and forming an external thread for connection with one of the pump plunger or barrel, said side wall forming an internal annular seat shoulder adjacent its lower end, against which a seat may abut to provide an annular seating area against which the valve ball may seal;

said external thread being located intermediate the upper and lower ends of the side wall;

stop means, integral with the side wall and extending transversely of the bore in spaced relation above the seat shoulder, for limiting upward rise of the ball from the seat, said side wall and stop means forming a confining enclosure within which the ball may travel vertically when unseated;

said stop means being located at the upper end of the side wall;

said side wall diminishing progressively in thickness between the seat shoulder and the stop means so that a tapered and upwardly enlarging portion of the bore is defined, whereby the flow area around the valve ball will increase as the ball rises from the seat toward the stop means; and said side wall forming a plurality of internal, elongated, circumferentially spaced apart, inwardly projecting ball guide ribs which extend longitudinally between the seat shoulder and the stop means and progressively increase in height, as the side wall diminishes, along their lengths from the seat shoulder to the stop means, so that they form a race of substantially constant diameter for vertically guiding the valve ball.

2. The cage as set forth in claim 1 wherein the ribs curve inwards at their upper ends and join to form the stop means, said rib upper ends having curved rims which combine to form a socket of hemi-spherical configuration adapted to conform to the valve ball.

3. The cage as set forth in claim 2 wherein the upper ends of the ribs have a helically twisting configuration so that they will impart rotational movement to fluid moving past them.

* * * * *